US008567722B2

(12) United States Patent
Rosman et al.

(10) Patent No.: US 8,567,722 B2
(45) Date of Patent: Oct. 29, 2013

(54) SPLICE AND ASSOCIATED METHOD FOR JOINING FUSELAGE SECTIONS

(75) Inventors: Richard R. Rosman, Seattle, WA (US); Larry Toler, Everett, WA (US); David Leibov, Seattle, WA (US)

(73) Assignee: The Boeing Company, Chicago, IL (US)

( * ) Notice: Subject to any disclaimer, the term of this patent is extended or adjusted under 35 U.S.C. 154(b) by 155 days.

(21) Appl. No.: 12/968,732

(22) Filed: Dec. 15, 2010

(65) Prior Publication Data

US 2012/0153082 A1 Jun. 21, 2012

(51) Int. Cl.
*B64C 1/06* (2006.01)
*B64C 1/00* (2006.01)

(52) U.S. Cl.
USPC .......................................... 244/131; 244/120

(58) Field of Classification Search
USPC ................................................. 244/120, 131
See application file for complete search history.

(56) References Cited

U.S. PATENT DOCUMENTS

| | | | | | |
|---|---|---|---|---|---|
| 5,518,208 | A | * | 5/1996 | Roseburg | 244/132 |
| 5,893,534 | A | * | 4/1999 | Watanabe | 244/119 |
| 7,159,822 | B2 | * | 1/2007 | Grantham et al. | 244/119 |
| 7,325,771 | B2 | | 2/2008 | Stulc et al. | |
| 7,823,362 | B2 | * | 11/2010 | Meyer | 244/120 |
| 8,371,529 | B2 | * | 2/2013 | Tacke et al. | 244/119 |
| 2006/0060705 | A1 | | 3/2006 | Stulc et al. | |
| 2006/0108058 | A1 | * | 5/2006 | Chapman et al. | 156/245 |
| 2010/0282905 | A1 | | 11/2010 | Cazeneuve et al. | |
| 2011/0042519 | A1 | * | 2/2011 | Tacke et al. | 244/131 |
| 2011/0185555 | A1 | | 8/2011 | Gallant et al. | |

FOREIGN PATENT DOCUMENTS

| | | |
|---|---|---|
| FR | 2 922 516 A1 | 4/2009 |
| WO | WO2009053645 * | 4/2009 |
| WO | WO 2009/156637 A2 | 12/2009 |

OTHER PUBLICATIONS

International Search Report and Written Opinion for Application No. PCT/US2011/059422 dated Mar. 13, 2012.

* cited by examiner

*Primary Examiner* — Rob Swiatek
*Assistant Examiner* — Marc Burgess
(74) *Attorney, Agent, or Firm* — Alston & Bird LLP

(57) ABSTRACT

A splice and an associated method are provided in order to efficiently join structures, such as adjacent fuselage sections. A splice for joining fuselage sections may include a strap configured to bridge the fuselage sections, a shear tie overlying the strap and a fitting positioned between the strap and the shear tie such that the strap and the shear tie are spaced apart. At least the strap and the fitting may be formed of a composite material. The fitting may have an H-shape and may have first and second longitudinally extending sections that extend beyond opposite sides of the strap. Each longitudinally extending section is configured to overlie at least two stringers of a respective fuselage section. The fitting may also have a medial portion upon which the shear tie is seated.

20 Claims, 9 Drawing Sheets

SPLICE AND ASSOCIATED METHOD FOR JOINING FUSELAGE SECTIONS

TECHNOLOGICAL FIELD

Embodiments of the present disclosure relate generally to splices and associated joining methods and, more particularly, to splices and associated methods for joining fuselage sections.

BACKGROUND

Sections of a structure are sometimes joined by a splice that bridges between and structurally joins the sections. As shown in FIG. 1, for example, the fuselage 10 of an aircraft may be formed of a plurality of sections 12 that are joined one to another. Adjacent fuselage sections 12 may be joined by a splice that serves to structurally interconnect the fuselage sections. For example, adjacent fuselage sections may be joined by a splice consisting of a frame or bulkhead that is positioned in the interior of the fuselage 10 and bridges between adjacent fuselage sections 12. A splice may also include a plurality of through fittings that extend through the frame and facilitate the joinder of the frame to the fuselage sections 12.

As shown, for example, in FIG. 2, each of a pair of adjacent fuselage sections may include a plurality of longitudinally extending stringers 14 and a skin 16 covering the plurality of stringers. The pair of adjacent fuselage sections 12 may be brought together and the splice may be attached to the pair of adjacent fuselage sections so as to bridge the interface between the adjacent fuselage sections. In the example of FIG. 2, the frame includes a frame outer chord 18 that is positioned proximate the fuselage sections and bridges the interface therebetween. The frame also includes a web 20 that extends radially inward and an inner chord 22. The splice of FIG. 2 also includes a plurality of through fittings 24. As shown, the frame and, more particularly, the web 20 defines a plurality of openings 26 through which the through fittings 24 extend. As shown, the through fittings 24 are configured to extend longitudinally beyond the frame so as to overlie stringers 14 of the fuselage sections 12. In this case, each through fitting 24 has a first end that overlies a stringer 14 of one of the fuselage sections 12 and an opposed second end that overlies the stringer of the other fuselage section. By connecting the splice, including both the frame and the through fittings 24, to the fuselage sections 12, the splice serves to structurally join the fuselage sections.

A splice, such as shown in FIG. 2, may be formed of a metallic material, such as titanium. Since titanium is a relatively expensive material, the material costs associated with a titanium splice may disadvantageously increase the cost associated with the aircraft. Additionally, a splice may be attached to the fuselage section by a plurality of fasteners, such as fasteners that extend through the frame to connect the frame to the fuselage sections and fasteners that extend through the through fittings to connect the through fittings to the stringers of the fuselage sections. In order to install the fasteners, a plurality of holes must first be drilled through the splice for receiving respective fasteners. However, the drilling of holes through a titanium splice takes a significant amount of time, thereby increasing the time required to assemble the fuselage sections as well as the labor costs associated with such assembly. Further, the holes drilled through a titanium splice generally require the parts to be separated and deburred, thereby further adding to the time and costs associated with the assembly of the fuselage.

BRIEF SUMMARY

A splice and an associated method are therefore provided according to embodiments of the present disclosure in order to efficiently join structures, such as adjacent fuselage sections. In this regard, the splice and the associated method may reduce the material costs associated with the splice, and may also reduce the time and associated labor costs associated with installation of the splice. Further, the resulting splice of some embodiments may advantageously be lighter.

In one embodiment, a splice for joining fuselage sections is provided with the splice including a strap configured to bridge the fuselage sections, a shear tie overlying the strap and a fitting positioned between the strap and the shear tie such that the strap and the shear tie are spaced apart. The fitting of this embodiment has first and second longitudinally extending sections that extend beyond opposite sides of the strap. Each longitudinally extending section is configured to overlie at least two stringers of a respective fuselage section.

The strap, the shear tie and the fitting may be formed of a composite material. In one embodiment, the fitting is H-shaped such that each longitudinally extending section includes first and second members that are spaced apart from one another and that overlie respective stringers. In this embodiment, the fitting may also include a medial portion between the first and second longitudinally extending sections on which the shear tie is seated. The splice may include a plurality of fittings and the shear tie may include a plurality of feet spaced apart from one another. As such, each foot of the shear tie of this embodiment may be seated upon the medial portion of a respective fitting. In addition, the plurality of fittings may be spaced apart from one another such that a portion of the strap is visible between neighboring fittings, thereby enabling inspection of the strap. The splice may also include a plurality of fasteners connecting the shear tie, the fitting and the strap to the fuselage sections. The fasteners may be formed, for example, of titanium. The splice may also include a web and an inner chord connected to and inboard of the shear tie. The splice of one embodiment may also include first and second fillers positioned between the first and second longitudinally extending sections of the fitting, respectively, and the stringers.

In another embodiment, a splice is provided that includes a strap formed of a composite material, a shear tie overlying the strap and an H-shaped fitting positioned between the strap and the shear tie such that the strap and the shear tie are spaced apart. The H-shaped fitting may also be formed of a composite material.

The H-shaped fitting of one embodiment includes a medial portion upon which the shear tie is seated. In this embodiment, the splice may include a plurality of fittings and the shear tie may include a plurality of feet spaced apart from one another with each foot of the shear tie being seated upon the medial portion of a respective fitting. The plurality of fittings may also be spaced apart from one another such that a portion of the strap is visible between neighboring fittings, thereby enabling inspection of the strap. The splice may also include a plurality of titanium fasteners connecting the shear tie, the H-shaped fitting and the strap to the fuselage sections. The splice may also include a web and an inner chord connected to and inboard of the shear tie. The splice of one embodiment may also include first and second fillers underlying opposite ends of the H-shaped fitting.

In a further embodiment, a method for joining fuselage sections is provided which includes positioning a strap upon the fuselage sections so as to bridge therebetween. The method of this embodiment also includes positioning a fitting upon the straps such that first and second longitudinally extending sections of the fitting extend beyond opposite sides of the strap. The positioning of the fitting includes positioning the fitting such that each longitudinally extending section overlies at least two stringers of the respective fuselage section. The method of this embodiment may also include positioning a shear tie upon the fitting and connecting the shear tie, the fitting, the strap and the fuselage sections with a plurality of fasteners.

In an embodiment in which the strap and the fitting are formed of a composite material, the shear tie, the fitting and the fuselage sections may be connected with a plurality of titanium fasteners. The method of one embodiment also includes positioning first and second fillers between the first and second longitudinally extending sections of the fitting, respectively, and the stringers of the respective fuselage sections. The method of one embodiment also includes connecting a web and an inner chord to the shear tie. In an embodiment in which the shear tie includes a plurality of feet spaced apart from one another, the positioning of the fitting may include positioning of a plurality of fittings upon the strap in a spaced-apart manner such that a portion of the strap is visible between neighboring fittings, thereby enabling inspection of the strap. And the positioning of the shear tie upon the fitting may include the positioning of the shear tie upon a plurality of fittings such that each foot of the shear tie is seated upon a medial portion of a respective fitting.

In accordance with embodiments of the present disclosure, a splice and an associated method are provided in order to join various structures, such as fuselage sections, in a manner that is efficient in terms of the material costs and the time and associated labor costs for installing the splice. However, the features, functions and advantages that have been discussed may be achieved independently, and the various embodiments of the present disclosure may be combined in other embodiments, further details of which may be seen with reference to the detailed description and drawings.

BRIEF DESCRIPTION OF THE DRAWINGS

Figure 1:
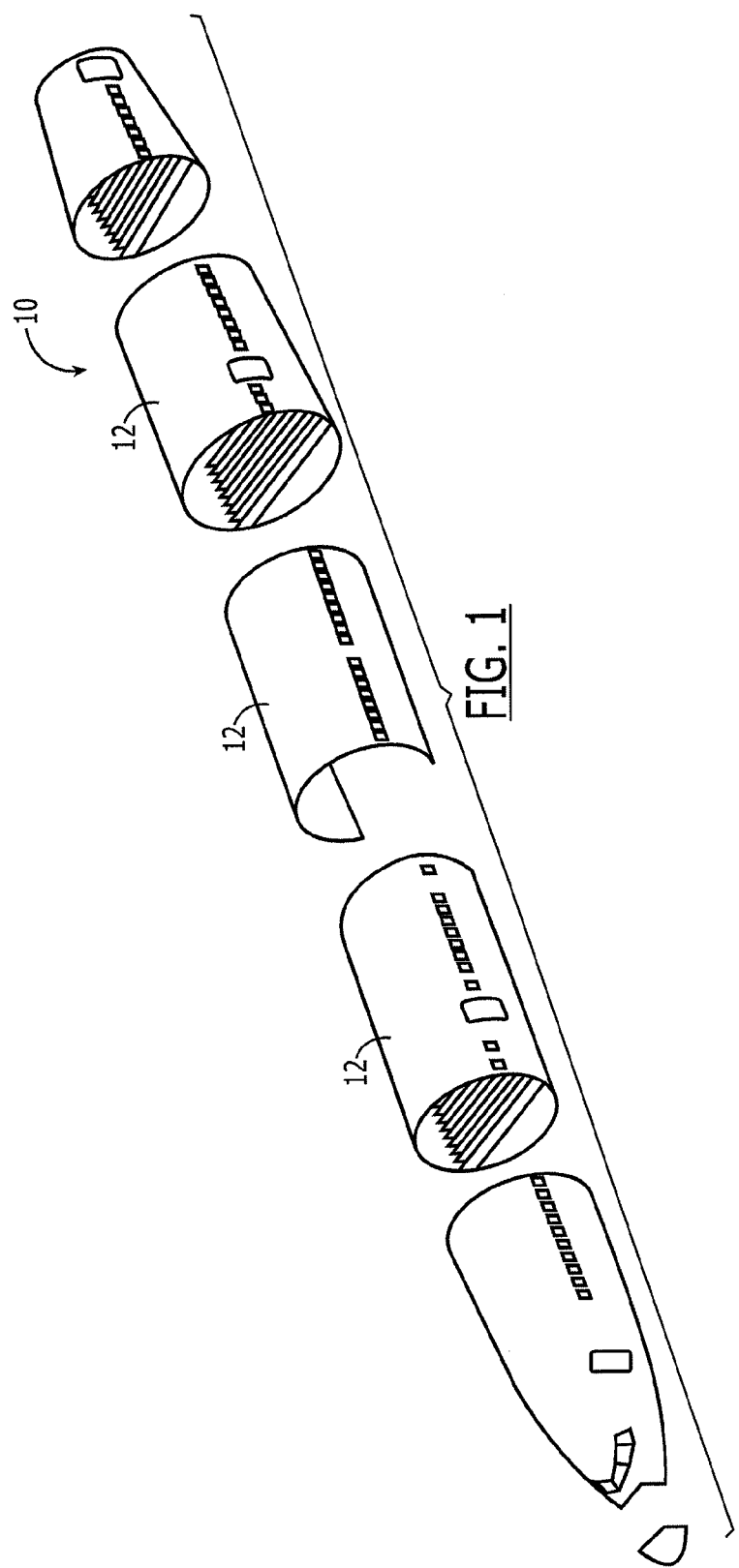
Figure 2:
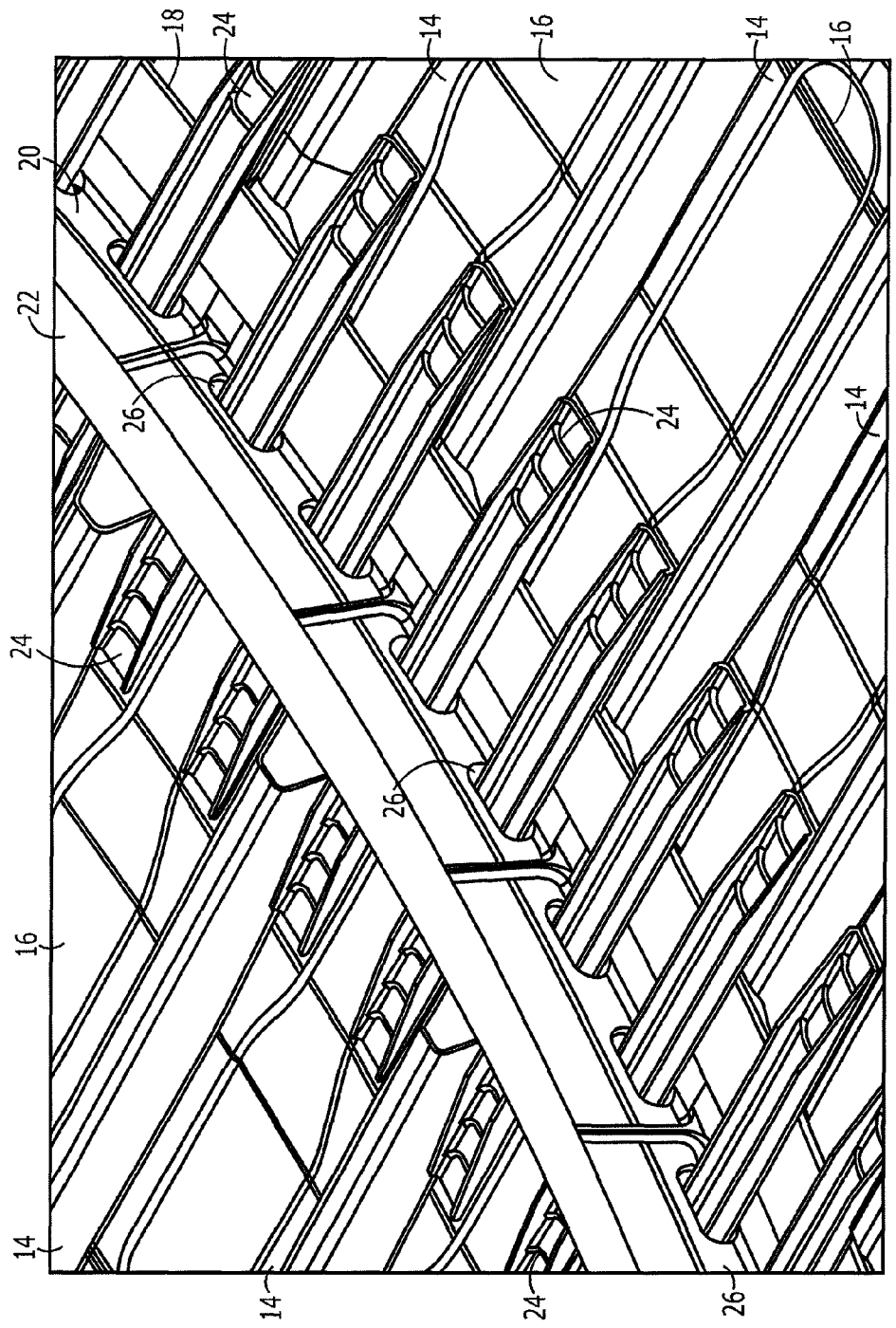
Figure 3:
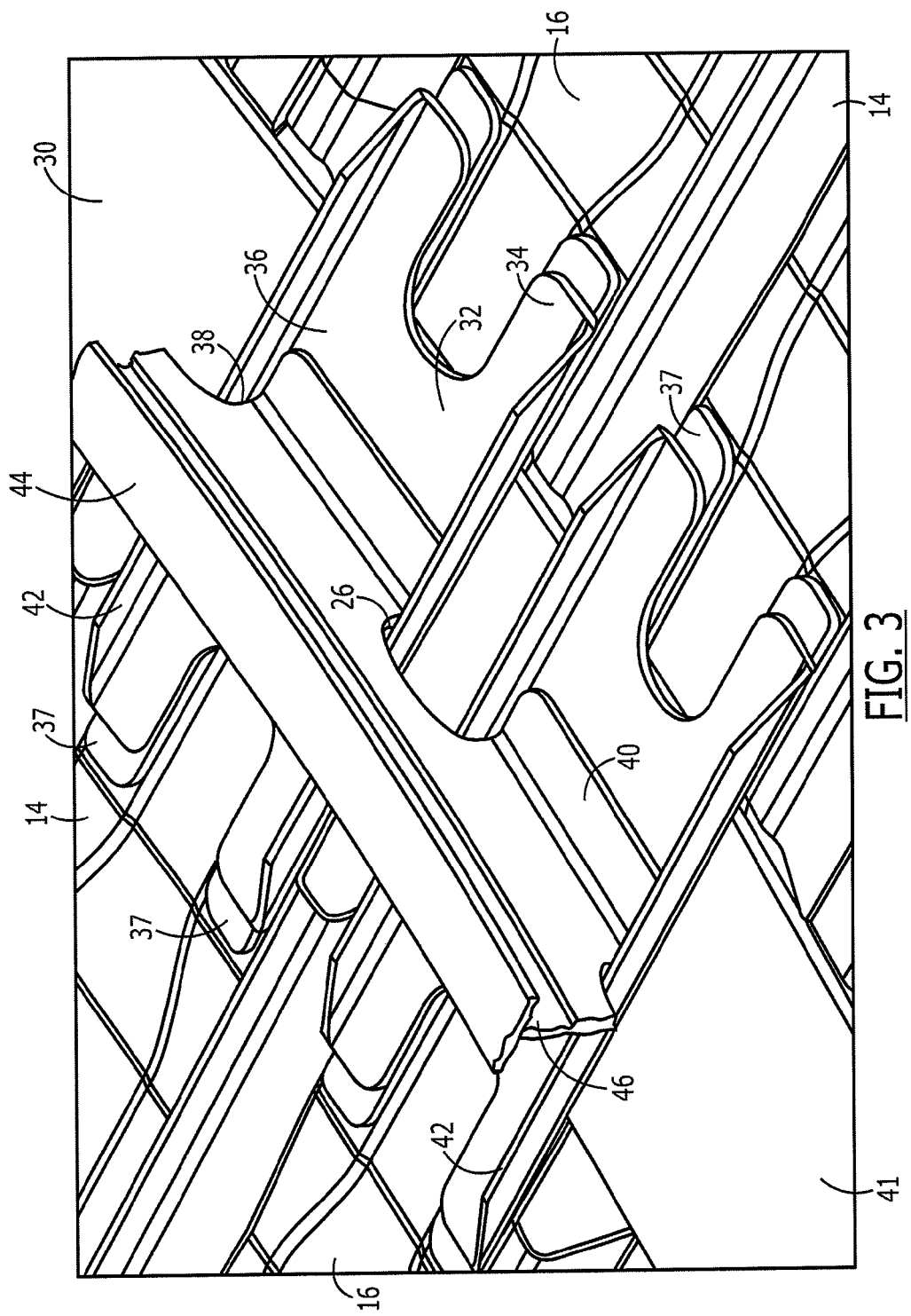
Figure 4:
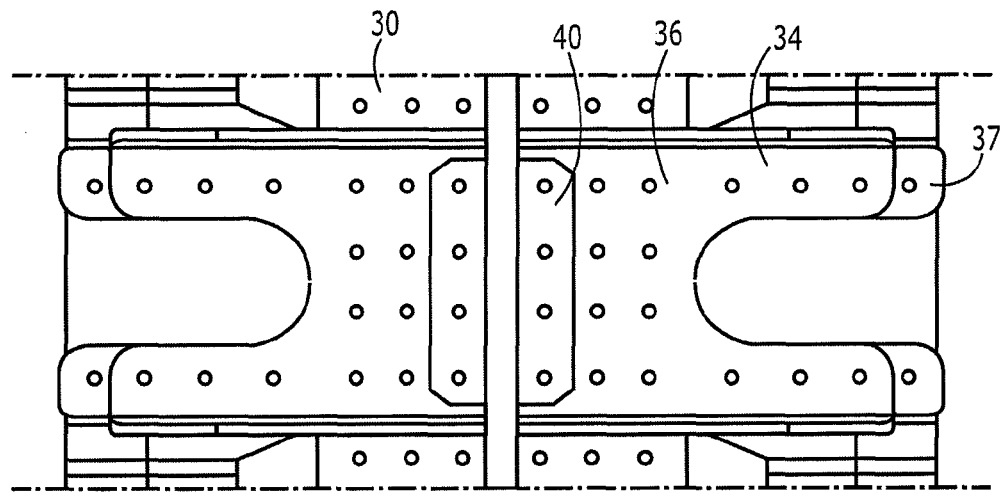
Figure 5A:
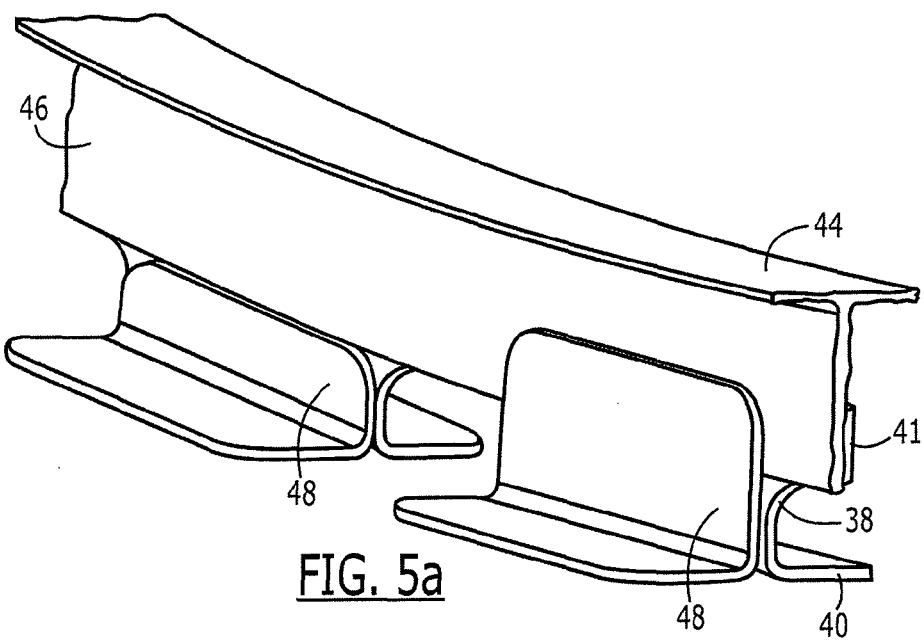
Figure 5B:
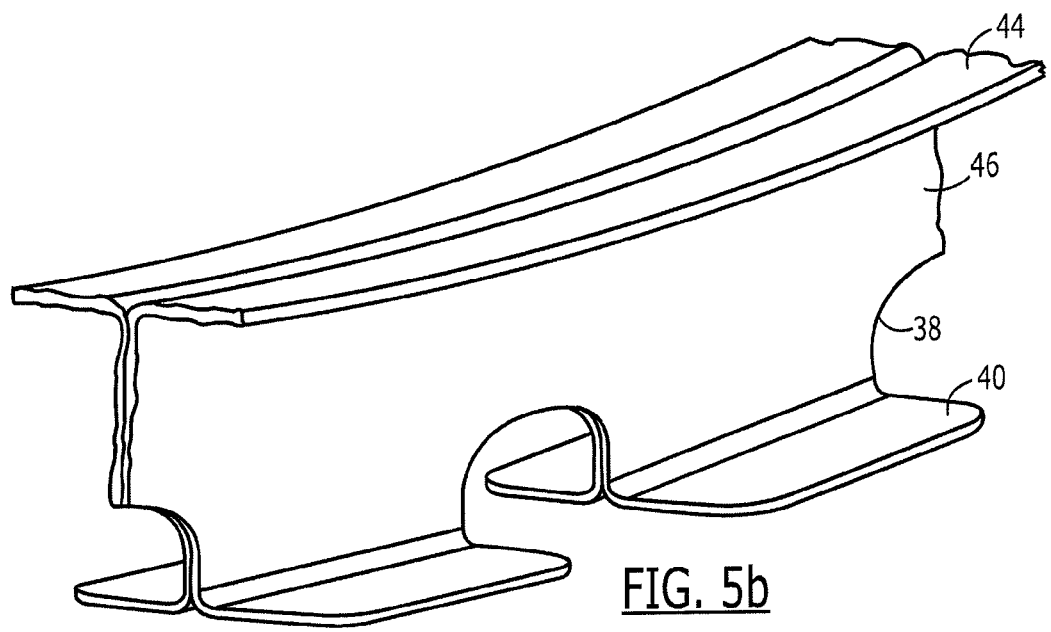
Figure 5C:
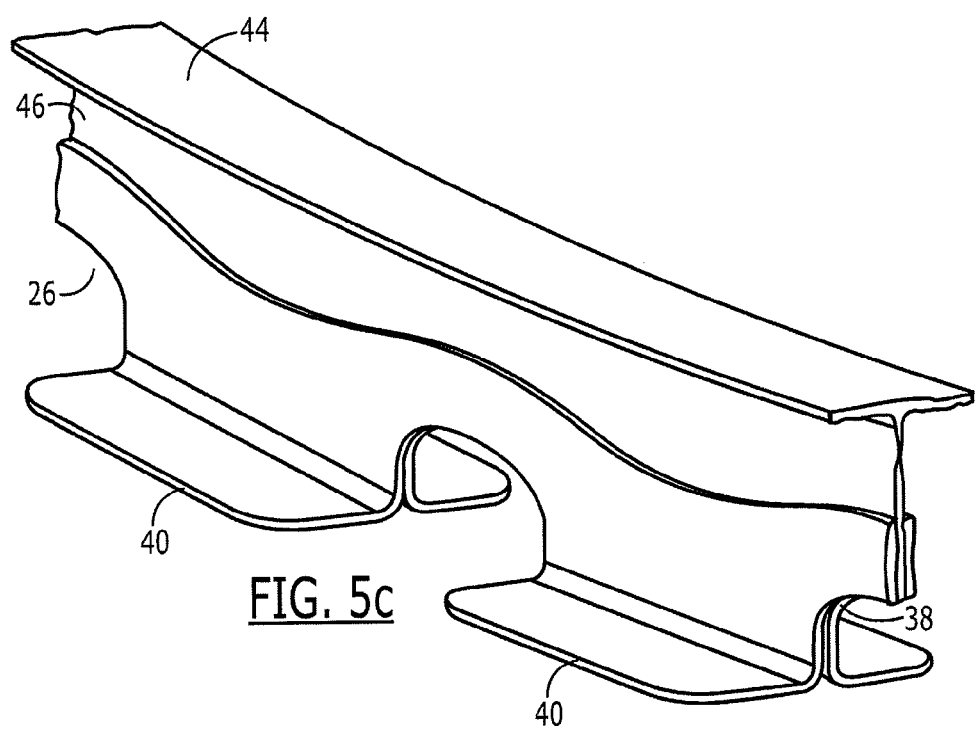
Figure 5D:
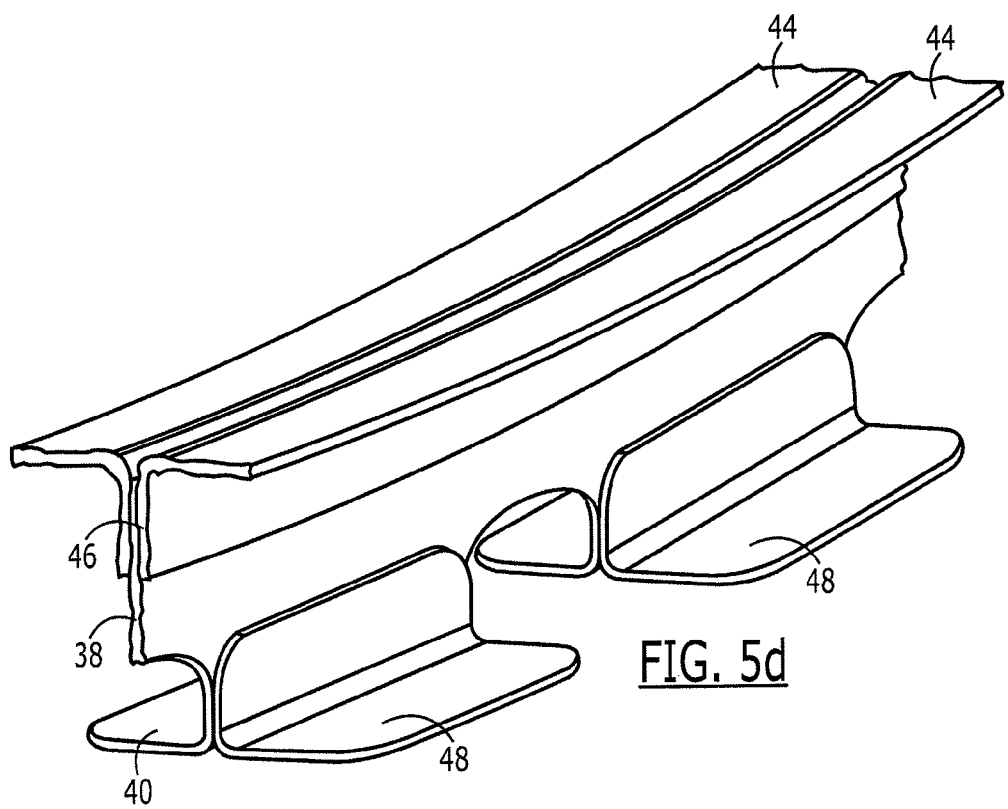
Figure 5E:
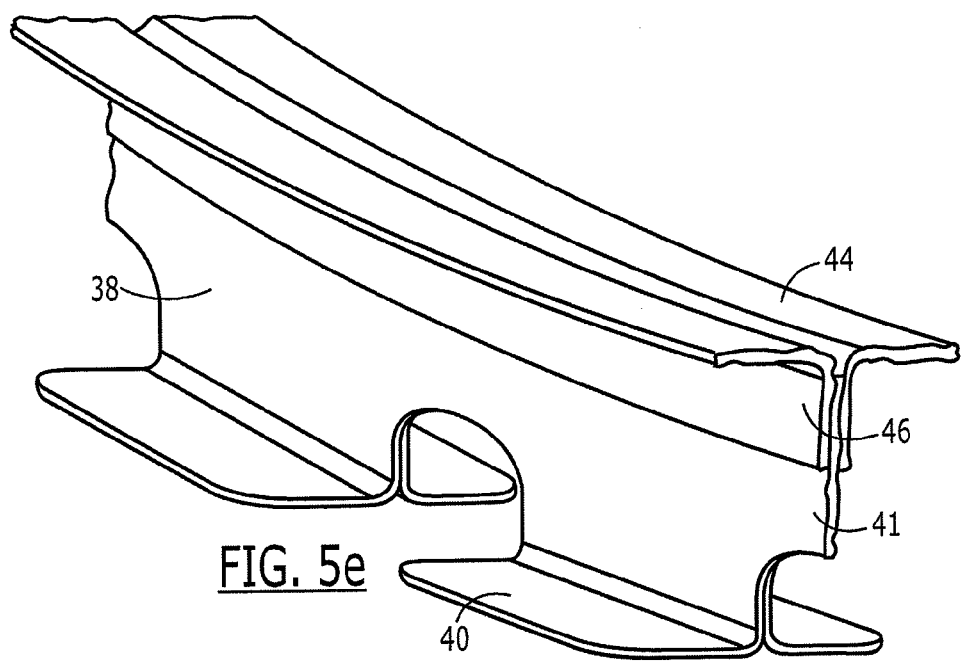
Figure 5F:
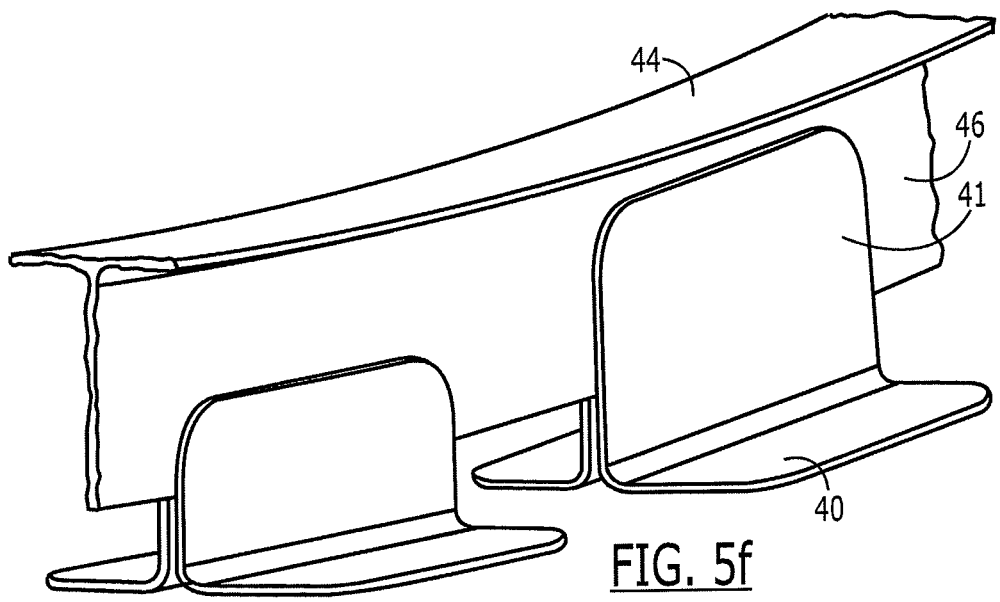
Figure 5G:
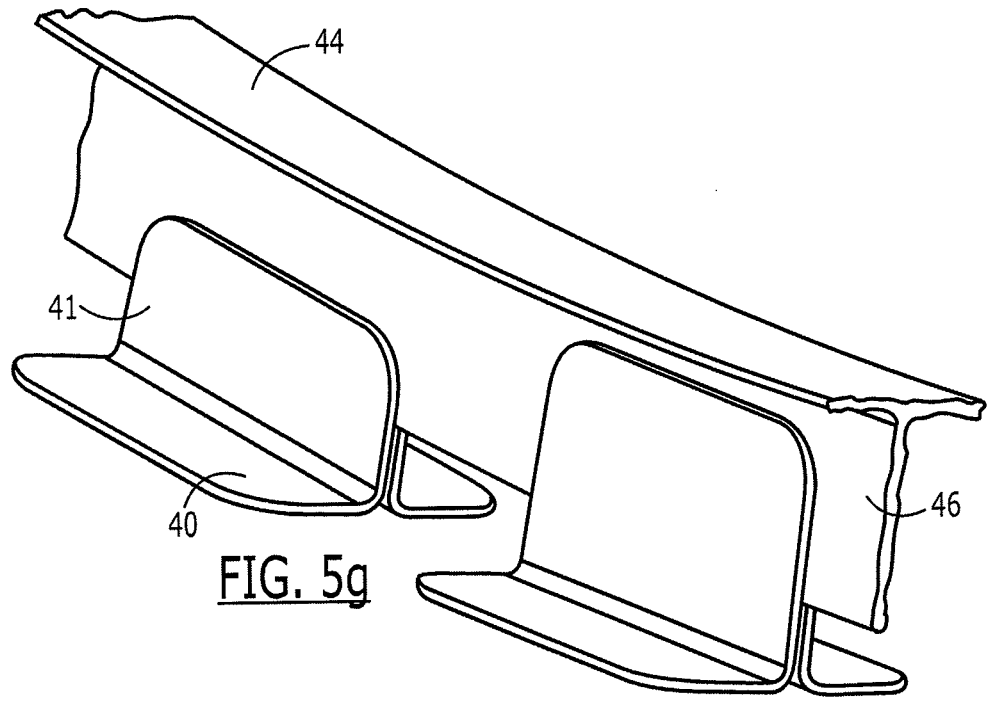
Figure 5H:
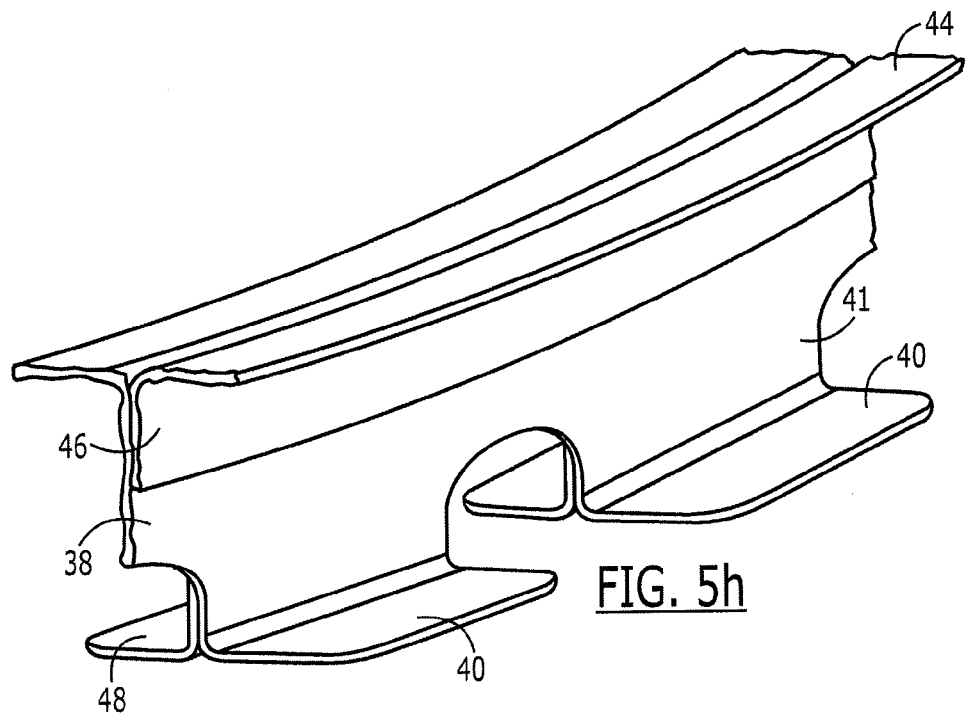
Figure 5I:
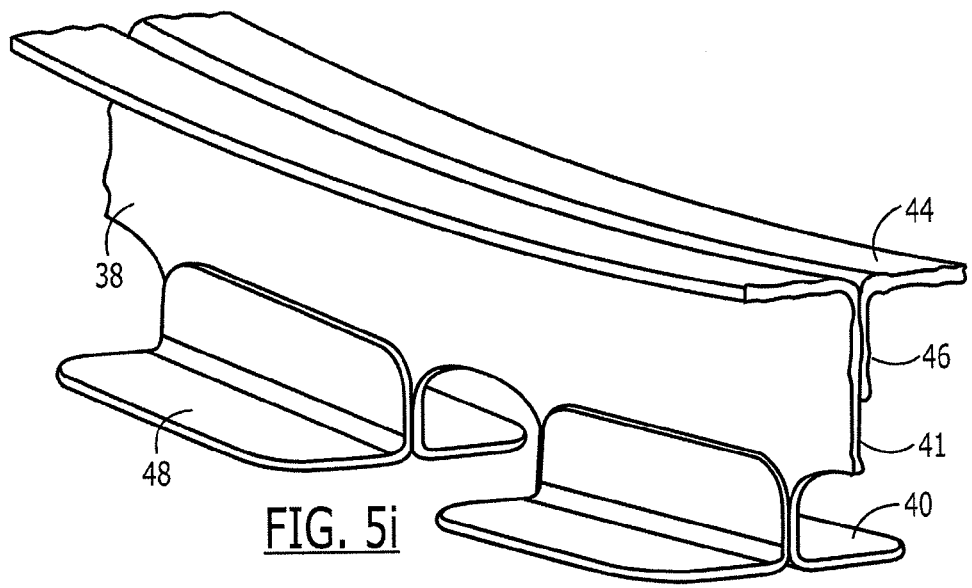
Figure 6:
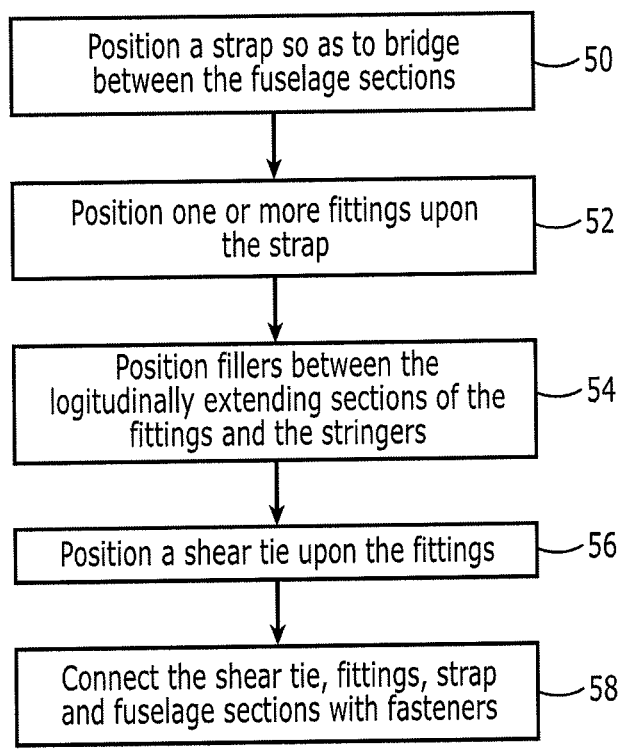

Having thus described embodiments of the disclosure in general terms, reference will now be made to the accompanying drawings, which are not necessarily drawn to scale, and wherein:

FIG. 1 is a schematic perspective view of a plurality of fuselage sections of an aircraft;

FIG. 2 is a perspective view of a conventional splice joining a pair of fuselage sections;

FIG. 3 is a perspective view of a splice for joining a pair of fuselage sections in accordance with one embodiment of the present disclosure;

FIG. 4 is a schematic representation of the splice of FIGS. 3 and 4 which illustrates the fasteners for joining the splice and the fuselage sections in accordance with one embodiment of the present disclosure;

FIGS. 5*a*-5*i* are perspective views of several configurations of the shear tie, web and inner chord in accordance with alternative embodiments of the present disclosure; and FIG. 6 is a flowchart illustrating the operations performed in accordance with one embodiment of the present disclosure.

DETAILED DESCRIPTION

Embodiments of the present disclosure now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

A splice for joining a pair of structures is provided in accordance with embodiments of the present disclosure. While the splice may join various structures, the splice will be described for purposes of illustration, but not of limitation, with respect to the joinder of a pair of fuselage sections 12 of an aircraft, such as those illustrated in FIG. 1.

A splice of one embodiment may bridge between and structurally join a pair of fuselage sections 12 that have been positioned adjacent one another so as to define a butt joint therebetween. With respect to the embodiment of FIG. 1, splices 28 are generally located at the opposed ends of a fuselage section 12. As described below in more detail in conjunction with FIG. 3, each fuselage section 12 may include a plurality of longitudinally extending stringers 14 and a skin 16 that is attached to and covers the plurality of stringers so as to form the exterior surface of the fuselage 10. The splice is positioned interior of the fuselage sections 12 and is positioned so as to bridge across and be connected to each of the adjacent fuselage sections, thereby integrating the fuselage sections and providing strength and stability to the resulting fuselage 10. The splice may extend about the entire inner circumference of the adjacent fuselage sections 12 or may extend about only one or more portions thereof.

A splice is shown in more detail in accordance with one embodiment in FIG. 3. As described above, the splice bridges between and is connected to adjacent fuselage sections 12, each of which is formed of a plurality of stringers 14 and an overlying skin 16. Although only a portion of the circumferentially extending splice is illustrated in FIG. 3, the splice may extend about the entire inner circumference of the fuselage sections 12. As shown in FIG. 3, the splice of this embodiment includes a strap 30 that extends at least partially circumferentially about the fuselage sections 12. The strap 30 has a width, as defined in the longitudinal direction of the aircraft, that is sufficient to bridge across and overlie portions of both of the adjacent fuselage sections 12. The strap 30 may be formed of a composite material, such as a composite fiber reinforced polymer, so as to provide the strength and stability required to structurally join the adjacent fuselage sections 12 while reducing the material costs, weight, and drilling and assembly time relative to more conventional splices that utilize metal parts.

The splice also includes a plurality of fittings 32 that are disposed upon the strap 30 and that extend in a longitudinal direction such that opposed ends of the fittings 32 extend longitudinally beyond the opposed sides of the strap so as to overlie the adjacent fuselage sections 12. As shown in the illustrated embodiment, each fitting 32 may include first and second longitudinally extending sections that extend beyond the opposite sides of the strap 30. Each longitudinally extending section may, in turn, be configured to overlie at least two stringers 14 of a respective fuselage section 12.

In the illustrated embodiment, each fitting 32 is H-shaped. As such, each longitudinally extending section may include first and second members 34 that are spaced apart from one another and overlie respective stringers 14. The fitting 32 of this embodiment may also include a medial portion 36 between the first and second longitudinally extending sections. The medial portion 36 of one embodiment extends across the width of the strap 30 with the longitudinally extending sections extending outwardly therefrom beyond the opposed sides of the strap 30. However, the medial portion 36 of the fitting 32 may have other widths relative to the strap 30. As such, the medial portion 36 of the fitting 32 need not extend across the entire width of the strap 30. Alternatively, the medial portion 36 of the fitting 32 may extend beyond the strap 30 in other embodiments.

The splice may include a plurality of fittings 32 overlying different circumferentially spaced portions of the strap 30. The plurality of fittings 32 may be spaced apart from one another in a circumferential direction such that a portion of the strap 30 is not covered by a fitting and is, instead, exposed or visible between neighboring fittings. As such, the strap 30 may be visually inspected to confirm that the strap remains properly secured to the fuselage sections 12. In contrast, the frame of a conventional splice was generally configured such that the strap could not be visibly inspected. The fittings 32 may also be formed of a composite material, such as a composite fiber reinforced polymer such as the same composite fiber reinforced polymer as that which forms the strap 30.

The strap 30 and the fittings 32 provide a dual or multi-load path across the joint so as to achieve fail-safety in the event that either the strap or the fittings were fail. In one embodiment as illustrated in FIG. 3, the longitudinally extending sections of the fitting 32 are spaced apart from the stringers 14 of the fuselage sections 12 as a result of the placement of the fittings upon the strap 30, with the strap therefore serving to space the fitting from the stringers of the fuselage sections, In order to facilitate secure engagement of the fittings 32 with the stringers 14 of the fuselage sections 12, the splice may also include fillers 37 positioned between the longitudinally extending sections of the fitting 32 and respective stringers 14 of the fuselage sections 12, thereby filling the space that otherwise exists between the longitudinally extending sections of the fitting and the stringers of the fuselage sections. Although the fillers 37 may have a shape and size that is the same as or smaller than the longitudinally extending sections of the fittings 32 such that the longitudinally extending sections of the fitting completely overlie the respective fillers, the fillers may extend in a longitudinal direction beyond the longitudinally extending sections of the fittings in other embodiments, such as that depicted in FIG. 3, so as to permit the fillers to be independently connected to the fuselage sections 12. The fillers 37 may also be formed of a composite material, such as a composite fiber reinforced polymer such as the same composite fiber reinforced polymer that forms the strap 30 and/or the fittings 32.

The splice also includes a shear tie 38 that extends circumferentially about at least a portion of the fuselage sections 12 and is generally positioned so as to overlie the strap 30 and, in turn, the butt joint between the fuselage sections. More particularly, the shear tie 38 is positioned to be seated upon the fittings 32 such that the fittings are positioned between the shear tie and the strap 30. In the embodiment in which the fittings 32 are H-shaped fittings, the shear tie 38 may be configured to have a plurality of feet 40 spaced apart from one another in a circumferential direction. The feet 40 of the shear tie 38 may be sized and positioned so as to be seated upon the medial portions 36 of respective fittings 32. Indeed, the H-shaped fittings 32 of one embodiment include upturned opposed edges 42 that further define the medial portions 36 of the fittings in order to facilitate the seating of the feet 40 of the shear tie 38 thereupon. Additionally, the upturned opposed edges 42 of the H-shaped fittings 32 may provide bending continuity across the joint since the stringers 14 terminate on each side of the joint. As shown in FIG. 3, the shear tie 38 of this embodiment defines an opening or mouse hole 26 between adjacent feet 40, thereby serving to circumferentially space the fittings 32 which, in turn, results in the exposure or visibility of a portion of the strap 30 between neighboring fittings. In addition to the feet 40, the shear tie 38 includes a portion 41 that extends radially inward from the feet.

The shear tie 38 may be formed of various materials. For example, the shear tie 38 may be formed with a composite material, such as a composite fiber reinforced polymer such as the same composite fiber reinforced polymer that may form the strap 30 and/or the fittings 32. Alternatively, the shear tie 38 may be formed of a metallic or other material, such as aluminum or titanium.

The splice of one embodiment also includes an inner chord 44 and web 46 connected to and inboard of the shear tie 38. In the illustrated embodiment, the web 46 is connected to the shear tie 38 and, in particular, to the radially inward extending portion 41 of the shear tie, such as by a plurality of fasteners, and extends radially inward from the shear tie. The inner chord 44 may be integral to or otherwise connected to the web 46 and may include a longitudinally extending portion such that the inner chord and web of one embodiment, such as that illustrated in FIG. 3, has a T-shape in cross-section. The inner chord 44 and web 46 extend at least partially circumferentially about the fuselage sections 12 and serve to add further strength and stability to the splice. The inner chord 44 and web 46 may be formed of various materials, but are formed of a metal, such as titanium, in one embodiment.

The splice also includes a plurality of fasteners that join the components of the splice to one another and to the fuselage sections 12. By way of illustration, FIG. 4 depicts one example of a pattern via which the fasteners may be installed in order to connect the splice to the fuselage sections 12 with each fastener location designated by a dot. As shown, the fasteners may extend through the strap 30, the shear tie 38, such as the feet 40 of the shear tie, the fittings 32, such as both the medial portion 36 and the longitudinally extending sections of the fittings, and the fillers 37 so as to connect these components to one another and to the fuselage sections 12. In order to install the plurality of fasteners, a plurality of holes must be formed, such as by drilling, in the various components of the splice so as to receive respective fasteners. Since a number of the holes and, in one embodiment, a majority of the holes, are formed, such as by drilling, through components, such as the strap 30, the fittings 32, the fillers 37 and optionally the shear ties 38, that are formed of a composite material, such as a composite fiber reinforced polymer material, the holes may be formed, such as by drilling, more rapidly and efficiently than the formation of comparable holes through titanium components. Additionally, the holes that are formed, such as by drilling, through the composite components of a splice according to embodiments of the present disclosure may be formed even more efficiently and cost effectively than comparable holes formed, such as by drilling, through comparable metal or titanium components since the components of the splice need not be separated and deburred.

A conventional splice, such as that shown in FIG. 2, may include Inconel® or other steel fasteners in order to obtain higher clamp-up forces to minimize the impact of fatigue effects on metal splice parts. Likewise, the fasteners of the splice of embodiments of the present disclosure may be formed of an austenitic nickel-chromium-based superalloy, such as Inconel® material. However, the fasteners may be formed of various other materials. Since a number, if not all, of the components through which the fasteners extend are formed of a composite material and, in any event, are not formed of titanium, the splice of one embodiment may include titanium fasteners which are generally less expensive and lighter than comparable Inconel® fasteners, thereby further reducing the costs associated with the splice of one embodiment. The splice of one embodiment may also include titanium fasteners, as opposed to Inconel® or other steel fasteners, since composite components, such as those that comprise the splice, are not sensitive to fatigue load in the same manner as comparable metal parts, such that the composite components generally do not require the high level of clamp-up forces required by metal parts that utilize Inconel® or other steel fasteners.

The shear tie 38 as well as the inner chord 44 and web 46 may be configured in a variety of manners. As shown in FIG. 3, the shear tie 38 includes a plurality of feet 40 spaced apart in the circumferential direction as well as a radially inwardly extending portion 41 to which the web 46 and inner chord 44 are attached. As shown in FIG. 5a, the shear tie 38 and associated inner chord 44 and web 46 of this embodiment may also include additional feet 48 attached to the web and/or the radially inwardly extending portion 41 of the shear tie with the additional feet extending in the opposite longitudinal direction from the feet 40 of the shear tie. By also connecting the additional feet 48 to the fitting 32, the shear tie 38, the web 46 and the inner chord 44 may be more securely attached to the fittings and the strap 30 of the splice. As shown in FIG. 5a, the additional feet 48 may have either a relatively short portion that extends radially inwardly so as to contact only the inwardly extending portion 41 of the shear tie 38 or a longer portion that extends radially inward so as to contact both the radially inwardly extending portion of the shear tie and at least a portion of the web 46. The additional feet 48 may be formed of various materials including a composite material, such as a composite fiber reinforced material, or a metal, such as titanium.

Another embodiment is depicted in FIG. 5b in which the shear tie 38, the web 46 and the inner chord 44 are integrated. In this embodiment, the shear tie 38, web 46 and inner chord 44 are formed of a pair of C-shaped channels positioned adjacent one another in a back-to-back fashion. The C-shaped channels may be fastened to one another, such as by a plurality of fasteners. Additionally, the C-shaped channels may be formed of various materials, including a composite material, such as composite fiber reinforced polymer.

A shear tie 38 of another embodiment is depicted in FIG. 5c. As shown, the shear tie 38 includes two portions that are positioned on opposite sides of the web 46 so as to sandwich the web therebetween. Each portion includes a plurality of feet 40 spaced apart in a circumferential direction, as well as a radially inwardly extending portion 41 that extends alongside the web 46. As before, the shear tie 38 may be formed of various materials, including a composite material, such as composite fiber reinforced polymer, or a metal, such as titanium.

A further embodiment of a shear tie 38 is illustrated from opposite sides in FIGS. 5d and 5e. In this embodiment, a shear tie 38 similar to that shown in the embodiment of FIG. 3 is provided that includes a plurality of feet 40 spaced apart in a circumferential direction and a plurality of additional feet 48 attached to the shear tie for providing increased strength and stability. The web 46 and inner chord 44 of this embodiment include two L-shaped sections that are positioned on opposite sides of the radially inwardly extending portion 41 of the shear tie 38 and are connected thereto, such as by a plurality of fasteners. As shown, the L-shaped web and inner chord sections are positioned in a back-to-back fashion such that the inner chord is defined by a pair of inner chord sections that extend in longitudinally opposed directions. The web 46 and inner chord 44 may be formed of various materials, including a composite material, such as a composite fiber reinforced polymer, or a metal, such as titanium.

Further, FIGS. 5f and 5g illustrate opposite sides of an alternative embodiment in which the shear tie 38 is formed of a plurality of discrete sections, each of which has a foot 40 and a radially inwardly extending portion 41. In this embodiment, the discrete sections of the shear tie 38 may be positioned in pairs on opposite sides of the web 46 such that the pairs of shear tie sections are connected to the web, such as by a plurality of fasteners, in the manner shown in FIGS. 5f and 5g. As before, the shear tie sections of this embodiment may be formed of various materials including a composite material, such as composite fiber reinforced polymer, or a metal, such as titanium.

The shear tie 38 of yet another embodiment is illustrated from opposite sides in FIGS. 5h and 5i. In this embodiment, the radially inwardly extending portion 41 of the shear tie 38 is integral with and defines at least a portion of the web 46 and the inner chord 44. In the illustrated embodiment, however, the web 46 and the inner chord 44 may also be partially defined by an L-shaped channel that is attached to the radially inwardly extending portion 41 of the shear tie 38. Additionally, the shear tie 38 may include additional feet 48 attached to the radially inwardly extending portion 41 of the shear tie as described above. As described above in conjunction with other embodiments, the shear tie 38, the additional feet 48 and/or the L-shaped channel may be formed of various materials including, for example, a composite material, such as a composite fiber reinforcement material, or a metal, such as titanium.

Regardless of the embodiment, the shear tie 38 extends at least partially circumferentially about the fuselage sections 12 and overlies the strap 30. However, the shear tie 38 is seated upon the fittings 32 and is therefore spaced from the strap 30. By separating the shear tie 38 from the strap 30 with the fittings 32, the shear tie may be formed of a different material in some embodiments than the fittings and the strap such that the fittings and the strap may be formed of a composite material that permits holes to be formed therein in a more cost-effective manner, even in instances in which the shear tie is still formed of a metal, such as titanium.

As shown in FIG. 6, a method of joining a pair of structures, such as a pair of adjacent fuselage sections 12, is also provided. As illustrated in operation 50, the method initially positions a strap 30 upon the fuselage sections 12 so as to bridge across the butt joint between the fuselage sections. One or more fittings 32 may then be positioned upon the strap 30 such that first and second longitudinally extending sections of the fitting extend beyond opposite sides of the strap. See operation 52. In this regard, the positioning of the fittings 32 may include positioning of the fittings such that each longitudinally extending section overlies at least two stringers 14 of a respective fuselage section 12. In this regard, the method of one embodiment may also include the positioning of first and second fillers 37 between the first and second longitudinally extending sections of the fittings 32, respectively, and the stringers 14 of the respective fuselage sections 12. See operation 54. The fillers 37 may be positioned prior to the positioning of the fittings 32 upon the strap 30 or following the positioning of the fittings upon the strap. Thereafter, a shear tie 38 may be positioned upon the fittings 32, and the shear tie 38, the fittings, the strap 30 and the fuselage sections 12 may be connected with a plurality of fasteners. See operations 56 and 58. As described above, the strap 30 and the fittings 32 of one embodiment may be formed of a composite material such that the shear tie 38, the fittings and the fuselage sections 12 may be connected with a plurality of fasteners formed of a metal, such as titanium. In one embodiment, the method also includes connecting an inner chord 44 to the shear tie 38, such as by means of a web 46 that extends from the inner chord and is connected to the shear tie.

As described above, the shear tie 38 of one embodiment may include a plurality of feet 40 spaced apart from one another. In this embodiment, the positioning of the fittings 32 may include the positioning of a plurality of fittings upon the strap 30 in a spaced-apart manner such that a portion of the strap is visible between neighboring fittings. In addition, the positioning of the shear tie 38 upon the fittings 32 in accordance with this embodiment may include the positioning of the shear tie upon the plurality of fittings such that each foot 40 of the shear tie is seated upon a medial portion 36 of a respective fitting.

As described above, the splice of embodiments of the present disclosure may be formed of materials that are more cost effective while providing ample strength and stability for the resulting structure, such as a fuselage 10. For example, the splice may include a number of components formed of a composite material that provides strength and stability while being cost effective in comparison to titanium or other components. Additionally, the splice may be provided in a manner that facilitates the installation of a splice in an efficient and therefore cost effective manner, such as by permitting a number of the holes that receive fasteners to be drilled through components formed of composite materials, as opposed to the drilling and deburring of holes in metals, such as titanium components.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A splice for joining fuselage sections, the splice comprising:
    a strap configured to bridge the fuselage sections;
    a shear tie overlying the strap and defining a plurality of openings; and
    a plurality of fittings with each fitting positioned between the strap and the shear tie such that the strap and the shear tie are spaced apart, each fitting having first and second longitudinally extending sections that extend beyond opposite sides of the strap, each longitudinally extending section being configured to overlie at least two stringers of a respective fuselage section,
    wherein the shear tie and the plurality of fittings are positioned such that a respective opening defined by the shear tie extends between a pair of neighboring fittings with edges of the pair of neighboring fittings extending through the respective opening such that the shear tie leaves exposed the portion of the strap between the pair of neighboring fittings.

2. A splice according to claim 1 wherein the shear tie and the plurality of fittings are comprised of a composite material.

3. A splice according to claim 1 wherein the fittings are H-shaped such that each longitudinally extending section comprises first and second members that are spaced apart from one another and that overlie respective stringers.

4. A splice according to claim 1 wherein each fitting further comprises a medial portion between the first and second longitudinally extending sections upon which the shear tie is seated.

5. A splice according to claim 4 wherein the shear tie comprises a plurality of feet spaced apart from one another, wherein each foot of the shear tie is seated upon the medial portion of a respective fitting such that a foot overlies only a single fitting.

6. A splice according to claim 1 further comprising a plurality of fasteners connecting the shear tie, the plurality of fittings and the strap to the fuselage sections.

7. A splice according to claim 6 wherein the plurality of fasteners are formed of titanium.

8. A splice according to claim 1 further comprising an inner chord connected to and inboard of the shear tie.

9. A splice according to claim 1 further comprising first and second fillers positioned between the first and second longitudinally extending sections of a respective fitting, respectively, and the stringers.

10. A splice comprising:
    a strap comprised of a composite material;
    a shear tie overlying the strap and defining a plurality of openings; and
    a plurality of H-shaped fittings with each H-shaped fitting positioned between the strap and the shear tie such that the strap and the shear tie are spaced apart, said H-shaped fittings comprised of a composite material,
    wherein the shear tie and the plurality of fittings are positioned such that a respective opening defined by the shear tie extends between a pair of neighboring fittings with edges of the pair of neighboring fittings extending through the respective opening such that the shear tie leaves exposed the portion of the strap between the pair of neighboring fittings.

11. A splice according to claim 10 wherein each H-shaped fitting comprises a medial portion upon which the shear tie is seated.

12. A splice according to claim 11 wherein the shear tie comprises a plurality of feet spaced apart from one another, wherein each foot of the shear tie is seated upon the medial portion of a respective fitting such that a respective foot overlies only a single fitting.

13. A splice according to claim 10 further comprising a plurality of titanium fasteners connecting the shear tie, the plurality of H-shaped fittings and the strap to a structure.

14. A splice according to claim 10 further comprising an inner chord connected to and inboard of the shear tie.

15. A splice according to claim 10 further comprising first and second fillers underlying opposite ends of each H-shaped fitting.

16. A method for joining fuselage sections, the method comprising:
    positioning a strap upon the fuselage sections so as to bridge there between;
    positioning a plurality of fittings upon the strap such that first and second longitudinally extending sections of each fitting extend beyond opposite sides of the strap, said positioning the fittings comprising positioning the fittings such that each longitudinally extending section overlies at least two stringers of a respective fuselage section;
    positioning a shear tie upon the fitting, wherein the shear tie defines a plurality of openings, and wherein the shear tie and the plurality of fittings are positioned such that a respective opening defined by the shear tie extends between a pair of neighboring fittings with edges of the pair of neighboring fittings extending through the respective opening such that the shear tie leaves exposed the portion of the strap between the pair of neighboring fittings; and connecting the shear tie, the fittings, the strap and the fuselage sections with a plurality of fasteners.

17. A method according to claim 16 wherein the strap and the fittings are comprised of a composite material, and wherein connecting the shear tie, the fittings and the fuselage sections comprises connecting the shear tie, the fittings and the fuselage sections with a plurality of titanium fasteners.

18. A method according to claim 16 further comprising positioning first and second fillers between the first and second longitudinally extending sections of each fitting, respectively, and the stringers of the respective fuselage section.

19. A method according to claim 16 further comprising connecting an inner chord to the shear tie.

20. A method according to claim 16 wherein the shear tie comprises a plurality of feet spaced apart from one another, and wherein positioning the shear tie upon the fittings comprises positioning the shear tie upon the plurality of fittings such that each foot of the shear tie is seated upon a medial portion of a respective fitting such that a respective foot overlies only a single fitting.

* * * * *